United States Patent
Sano et al.

(10) Patent No.: US 8,381,238 B2
(45) Date of Patent: Feb. 19, 2013

(54) INFORMATION PROCESSING APPARATUS, INFORMATION PROCESSING METHOD, AND PROGRAM

(75) Inventors: Akane Sano, Tokyo (JP); Ugo Di Profio, Kanagawa (JP); Tsutomu Sawada, Tokyo (JP); Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/114,581

(22) Filed: May 24, 2011

(65) Prior Publication Data
US 2012/0096481 A1    Apr. 19, 2012

(30) Foreign Application Priority Data
Jun. 2, 2010    (JP) ................................ P2010-127111

(51) Int. Cl.
H04N 21/258    (2011.01)
G06F 3/048    (2006.01)
A63F 9/24    (2006.01)

(52) U.S. Cl. ............... 725/12; 725/10; 715/707; 463/36

(58) Field of Classification Search .................... None
See application file for complete search history.

(56) References Cited

U.S. PATENT DOCUMENTS

| | | | |
|---|---|---|---|
| 6,934,915 B2 * | 8/2005 | Rudd et al. .................... | 715/765 |
| 6,988,072 B2 | 1/2006 | Horvitz | |
| 7,716,697 B2 * | 5/2010 | Morikawa et al. .............. | 725/10 |
| 7,738,860 B2 * | 6/2010 | Attride et al. .............. | 455/414.1 |
| 7,792,820 B2 * | 9/2010 | Basson et al. .................. | 707/713 |
| 7,904,017 B2 * | 3/2011 | Maron et al. .................... | 434/362 |
| 8,032,839 B2 * | 10/2011 | Mall .............................. | 715/811 |
| 8,137,112 B2 * | 3/2012 | Woolf et al. ................... | 434/323 |
| 8,185,923 B2 * | 5/2012 | Slaney et al. .................... | 725/34 |
| 2005/0114776 A1 * | 5/2005 | Wood et al. .................... | 715/709 |
| 2005/0120313 A1 * | 6/2005 | Rudd et al. .................... | 715/866 |
| 2006/0075345 A1 * | 4/2006 | Sherman ........................ | 715/707 |
| 2008/0148150 A1 * | 6/2008 | Mall ............................. | 715/707 |
| 2009/0147148 A1 * | 6/2009 | Morikawa et al. ............ | 348/734 |
| 2009/0177528 A1 * | 7/2009 | Wu et al. ......................... | 705/10 |
| 2010/0063880 A1 * | 3/2010 | Atsmon et al. ............. | 705/14.53 |
| 2010/0319043 A1 * | 12/2010 | Jain et al. ....................... | 725/110 |

FOREIGN PATENT DOCUMENTS

| | | |
|---|---|---|
| JP | 2004-333543 | 11/2004 |
| JP | 2005-202076 | 7/2005 |
| JP | 2008-217444 | 9/2008 |

* cited by examiner

*Primary Examiner* — Kristine Kincaid
*Assistant Examiner* — Oschta Montoya
(74) *Attorney, Agent, or Firm* — Finnegan, Henderson, Farabow, Garrett & Dunner LLP

(57) ABSTRACT

An information processing apparatus includes an image analyzing unit performing a process of analyzing an image shot by a camera, a voice analyzing unit performing a process of analyzing voice input from a microphone, and a data processing unit receiving inputs of an analysis result of the image analyzing unit and an analysis result of the voice analyzing unit and controlling information to be output to a user. The data processing unit determines an output mode of the information to be provided to the user based on user information obtained from at least either one of the image analysis result and the voice analysis result, and system state information, and outputs the information to the user in the determined output mode.

8 Claims, 7 Drawing Sheets

FIG. 5

| DESCRIPTION TYPE | SPECIFIC EXAMPLES OF DESCRIPTION |
|---|---|
| (a) NORMAL DESCRIPTION | — "SINCE (IF CAUSE IS KNOWN)...,' 'XXX CAN BE USED.' EXAMPLES: "SINCE SOCCER HAS NOT BEEN REGISTERED AS A SEARCH KEYWORD, PLEASE SEARCH FOR SPORTS." "SINCE WORDS CANNOT BE RECOGNIZED, PLEASE SAY THAT AGAIN." "SINCE YOUR VOICE CANNOT BE RECOGNIZED, PLEASE SAY THAT AGAIN A LITTLE MORE LOUDLY." |
| (b) BRIEF DESCRIPTION | — "PLEASE SEARCH FOR SPORTS." <br> — "YOU CAN USE SPORTS." <br> — "PLEASE SAY THAT AGAIN A LITTLE MORE LOUDLY." <br> — "PLEASE SAY THAT AGAIN." |
| (c) DETAILED DESCRIPTION | — "USABLE COMMANDS ARE DISPLAYED IN THE GUIDE WINDOW." <br> — "ON THIS SCREEN, A GENRE SUCH AS MOVIE OR SPORTS, A CHANNEL SUCH AS NHH OR TOKYO TELEVISION ... CAN BE SPECIFIED." <br> — "YOU CAN SELECT A GENRE FROM MOVIE, SPORTS, ANIME, MUSIC, VARIETY SHOW, AND DRAMA." <br> — "SAY AS 'CHANGE IT TO XXX.'" |

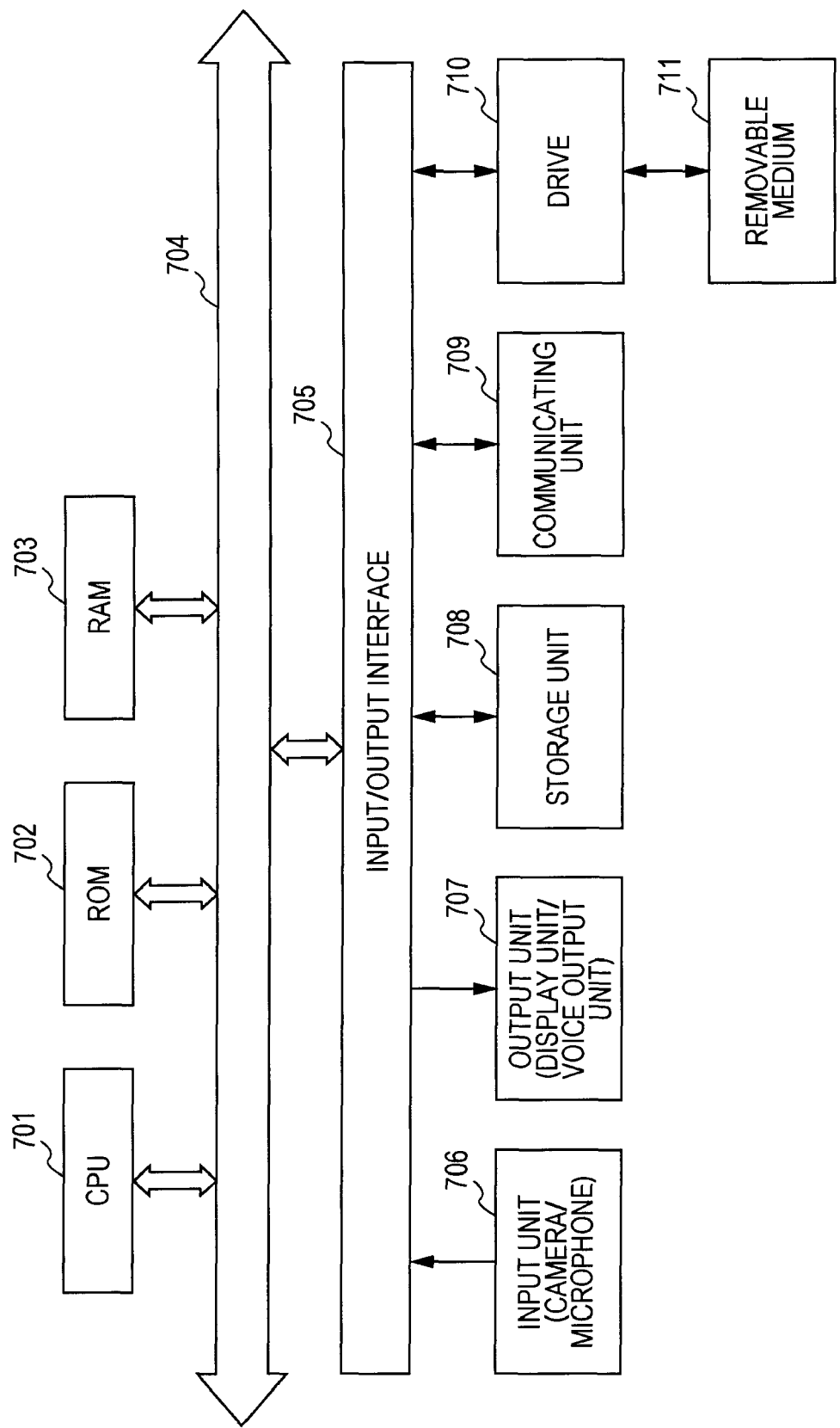

INFORMATION PROCESSING APPARATUS, INFORMATION PROCESSING METHOD, AND PROGRAM

BACKGROUND

The present disclosure relates to an information processing apparatus, information processing method, and program. In particular, the present disclosure relates to an information processing apparatus, information processing method, and program for performing various processes based on user's speech or the like.

When using various home appliances, such as a PC, a television set, and a video recorder/player, a user operates an input unit, a remote controller, or the like equipped to each device to cause the device to perform a desired process. For example, when a PC is used, a keyboard or a mouse is often used as an input device. Also, for a television set or a video recorder/player, a remote controller is often used to perform various processes, such as switching channels and selecting a content to be reproduced.

Various studies have been conducted regarding a system for executing instructions to these various devices with user's speech and motion. Specifically, examples of this system include a system for recognizing user's speech by using voice recognition and a system for recognizing user's action and gesture by using image processing.

An interface for communications with a user by using a plurality of various communication modes including voice recognition and image recognition, in addition to general input devices, such as a remote controller, a keyboard, and a mouse, is called a multi-modal interface. An example of related art regarding the multi-modal interface is disclosed in U.S. Pat. No. 6,988,072.

However, a voice recognition apparatus and an image recognition apparatus for use in this multi-modal interface or the like have a limitation on performance, limiting recognizable user's speech and motions. Therefore, under the present circumstances, it is often the case that the intention of the user is not correctly transferred to a system side.

For an information processing apparatus to provide information to a user or respond to a user's request, there are various methods, such as displaying a message on a display unit and outputting voice and sound effect via a loudspeaker.

However, description based on voice may be garrulous to some users, and may also be missed by some users. Moreover, when description and help information are presented on a display unit, these description and help information are useless if the user is not watching the display unit.

The following documents are examples of related art disclosing the structure for controlling a response from a system.

Japanese Unexamined Patent Application Publication No. 2004-333543 discloses a voice interaction system and voice interaction method, describing the structure for providing the voice interaction system and voice interaction method capable of changing voice output on a system side according to the user's learning degree of using the voice interaction system.

Also, Japanese Unexamined Patent Application Publication No. 2005-202076 discloses a technology for smoother interaction according to the distance between a user and a system. Specifically, in the suggested technology, when a robot and a user are distanced apart from each other, there is a high possibility that voice produced from the robot is inaudible to the user, and therefore the volume of the voice of the robot is turned up for smooth interaction.

However, the structures described in these documents are directed to a process for a specific point, such as the user's learning degree or distance, and observation information from various points of view is not used.

Furthermore, Japanese Unexamined Patent Application Publication No. 2008-217444 discloses an apparatus, method, and program for interaction with a user. Specifically, based on the state of a close watch from the user, a response is changed for natural interaction. When the position of the user is far away or the line of sight is not directed to a television set, a response to a request from the user is performed by using voice. To do this, an infrared ray or a sound wave is used to detect the distance from the user and the direction of the line of sight. However, in this structure, the user disadvantageously wears some device.

SUMMARY

It is desirable to provide an information processing apparatus, information processing method, and program capable of monitoring the state of a user and providing a message and help information from the apparatus to the user in an optimum method according to the state of the user.

In an embodiment of the present disclosure, an information processing apparatus includes an image analyzing unit performing a process of analyzing an image shot by a camera, a voice analyzing unit performing a process of analyzing voice input from a microphone, and a data processing unit receiving inputs of an analysis result of the image analyzing unit and an analysis result of the voice analyzing unit and controlling information to be output to the user. The data processing unit determines an output mode of the information to be provided to the user based on user information obtained from at least either one of the image analysis result and the voice analysis result, and system state information, and outputs the information to the user in the determined output mode.

Furthermore, in the information processing apparatus of the embodiment of the present disclosure, the data processing unit determines based on the analysis result of the image analyzing unit whether the user is paying attention to the information processing apparatus and, when determining that the user is not paying attention to the information processing apparatus, performs information output with voice or sound effect.

Still further, in the information processing apparatus of the embodiment of the present disclosure, the data processing unit determines based on the analysis result of the image analyzing unit whether the user is in front of the information processing apparatus and, when determining that the user is not in front of the information processing apparatus, performs information output with voice or sound effect.

Still further, in the information processing apparatus of the embodiment of the present disclosure, the data processing unit performs information output to the display unit when determining based on the system state information that the information processing apparatus is playing a content to the display unit.

Still further, in the information processing apparatus of the embodiment of the present disclosure, the data processing unit determines based on the system state information whether the information processing apparatus is to output a warning to the user and, when determining that a warning is to be output, performs information output with voice or sound effect.

Still further, in the information processing apparatus of the embodiment of the present disclosure, the data processing unit controls output by changing a level of information to be output to the user based on information about errors previously caused by the user.

Still further, in the information processing apparatus of the embodiment of the present disclosure, the data processing unit performs control of outputting detailed description when the number of times of errors of a same type caused by a same user exceeds a predetermined threshold within a predetermined period.

Still further, in the information processing apparatus of the embodiment of the present disclosure, the data processing unit performs control of outputting detailed description when the number of times of errors of a plurality of different types successively caused by a same user exceeds a predetermined threshold within a predetermined period.

Still further, in the information processing apparatus of the embodiment of the present disclosure, the data processing unit determines a level of skill of the user for using the information processing apparatus based on operation history information indicating previous operations performed by the user on the information processing apparatus and, performs control of outputting brief description when determining that the user is not a beginner, and outputting detailed description or description at a normal level when determining that the user is a beginner.

Still further, in another embodiment of the present disclosure, an information processing method to be performed in an information processing apparatus includes analyzing an image shot by a camera using an image analyzing unit, analyzing voice input from a microphone using a voice analyzing unit, and receiving inputs of an analysis result of the image analyzing unit and an analysis result of the voice analyzing unit and controlling information to be output to the user using a data processing unit, wherein an output mode of the information to be provided to the user is determined based on user information obtained from at least either one of the image analysis result and the voice analysis result, and system state information, and the information is output to the user in the determined output mode.

Still further, in still another embodiment of the present disclosure, a program causing an information processing apparatus to perform information processing includes analyzing an image shot by a camera using an image analyzing unit, analyzing voice input from a microphone using a voice analyzing unit, and receiving inputs of an analysis result of the image analyzing unit and an analysis result of the voice analyzing unit and controlling information to be output to the user using a data processing unit, wherein an output mode of the information to be provided to the user is determined based on user information obtained from at least either one of the image analysis result and the voice analysis result, and system state information, and the information is output to the user in the determined output mode.

Note that an example of the program of the still other embodiment of the present disclosure can be provided to an information processing apparatus and a computer system capable of executing various program codes from a storage medium or a communication medium in a computer-readable format. With such a program being provided in a computer-readable format, processes according to the program are performed on the information processing apparatus or the computer system.

Still other features and advantages of embodiments of the present disclosure will become apparent from more detailed description based on embodiments and attached drawings of the present disclosure, which will be described further below. Note that the system in the specification refers to a logical collective structure of a plurality of apparatuses, and is not restricted to a system in which the respective apparatuses are within one box.

According to embodiments of the present disclosure, there is provided an apparatus and method of providing information with a level or mode of information provision to a user being changed according to the state of a user or the state of a system. Specifically, a data processing unit receives inputs of an analysis result of an image analyzing unit performing a process of analyzing an image shot by a camera and an analysis result of a voice analyzing unit performing a process of analyzing voice input from a microphone and controls output of information to a user. The data processing unit determines an output mode of the information to be provided to the user based on user information obtained from at least either one of the image analysis result and the voice analysis result, and system state information, and outputs the information to the user in the determined output mode. With this process, information can be reliably transferred according to the state of the user.

BRIEF DESCRIPTION OF THE DRAWINGS

FIG. 5 is a drawing for describing an example of processes to be performed by the information processing apparatus according to the embodiment of the present disclosure;

FIG. 7 is a drawing for describing an example of hardware structure of the information processing apparatus according to the embodiment of the present disclosure.

DETAILED DESCRIPTION OF EMBODIMENTS

With reference to the drawings, an information processing apparatus, information processing method, and program according to embodiments of the present disclosure are described in detail below. Note that description is made according to the following items.

Figure 1:
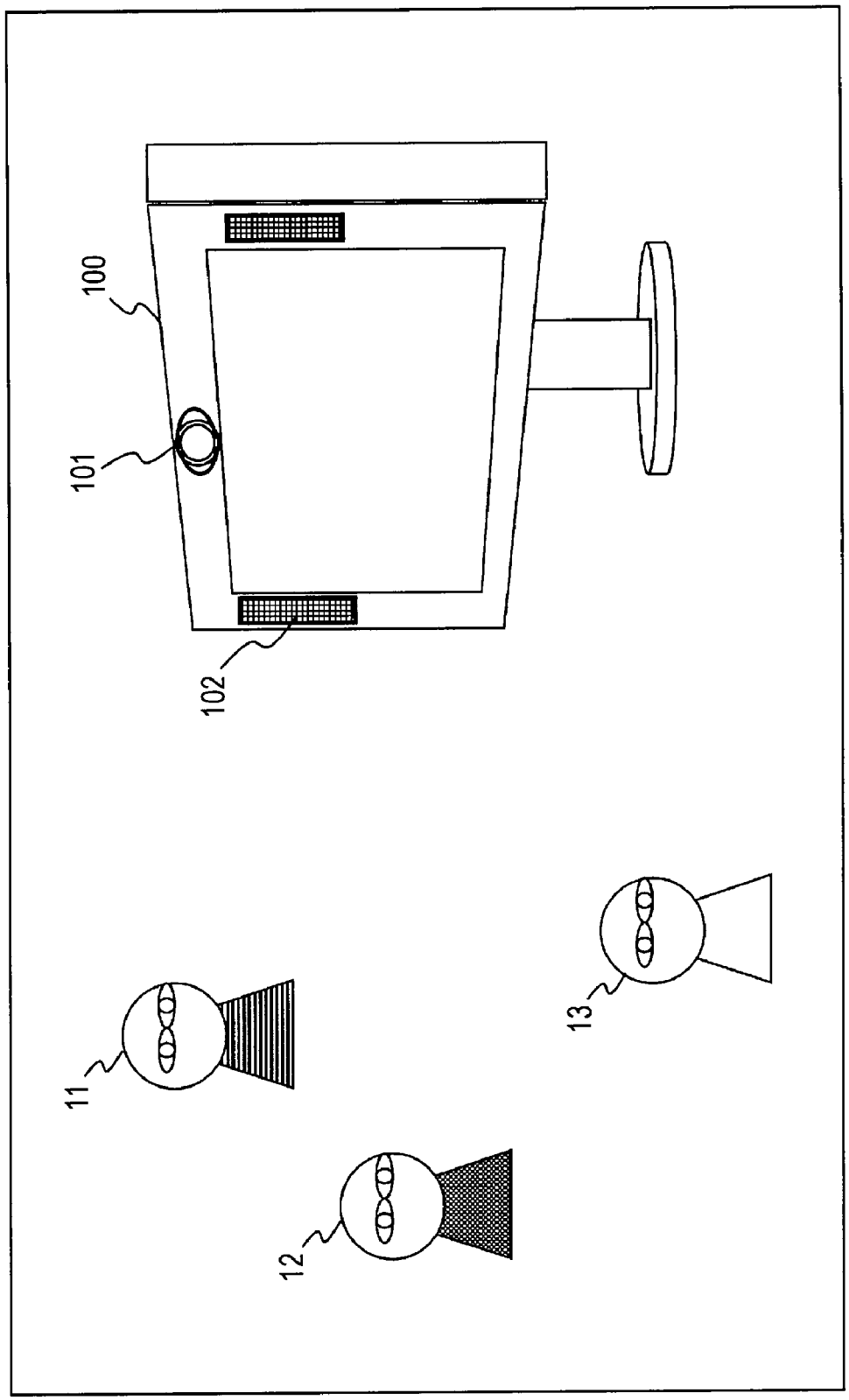
FIG. 1 is a diagram for describing an example of use of an information processing apparatus according to an embodiment of the present disclosure.

1. General Outline of Processes to Be Performed by the Information Processing Apparatus According to an Embodiment of the Present Disclosure 2. Example of Structure of the Information Processing Apparatus According to the Embodiment of the Present Disclosure 3. Specific Example of the Information Output Process to a User 4. Example of Hardware Structure of the Information Processing Apparatus 1. General Outline of Processes to Be Performed by the Information Processing Apparatus According to an Embodiment of the Present Disclosure First, with reference to FIG. 1, a general outline of processes to be performed by the information processing apparatus according to an embodiment of the present disclosure is described. In FIG. 1, a television set is shown as an example of the information processing apparatus according to the embodiment of the present disclosure. An information processing apparatus 100 performs, for example, a process of displaying a broadcast content, a process of playing a content recorded on a built-in video recorder/player, such as a hard disk, DVD, or Blu-ray disk, and a process of recording a program on the video recorder/player.

A plurality of users are present in front of the information processing apparatus 100. In the example shown in FIG. 1, a user a, 11, a user b, 12, and a user c, 13 are present. These users make various requests to the information processing apparatus 100. Examples of requests include requests for channel switching, volume adjustment, start of video recording, display of an at-a-glance list of recorded contents, selected play of a content from the list, stop of playing, and fast-forward.

Each user makes these requests with voice, that is, speech. The information processing apparatus 100 has a camera 101 and a voice input/output unit 102 including a microphone and a loudspeaker. Words produced from the users a to c, 11 to 13, are input into the information processing apparatus 100 via the voice input/output unit 102 including the microphone and the loudspeaker. Images of the users a to c, 11 to 13, are input into the information processing apparatus 100 via the camera 101.

The information processing apparatus 100 analyzes these input information, determines an action to be performed by the apparatus, and performs the action. When the user's request is understood, a process according to the request is performed, for example, switching channels or selecting and playing a content.

Also, the information processing apparatus 100 of the embodiment of the present disclosure analyzes the orientation of the face of the user, the direction of paying attention, the state of occurrence of errors, the current state of the system, and others and, based on this analysis result, provides information to the user with a level or mode of information provision to the user being changed. Specific processes of these are described further below.

2. Example of Structure of the Information Processing Apparatus According to the Embodiment of the Present Disclosure Next, with reference to FIG. 2, an example of structure of the information processing apparatus of the embodiment of the present disclosure is described. The information processing apparatus 100 depicted in FIG. 2 corresponds to, for example, the information processing apparatus 100 depicted in FIG. 1. Note that the information processing apparatus of the embodiment of the present disclosure is not restricted to a television set, but can be any one of various home appliances, such as a PC, a video recorder/player, and others. That is, the information processing apparatus performs various processes according to a user's request.

Figure 2:
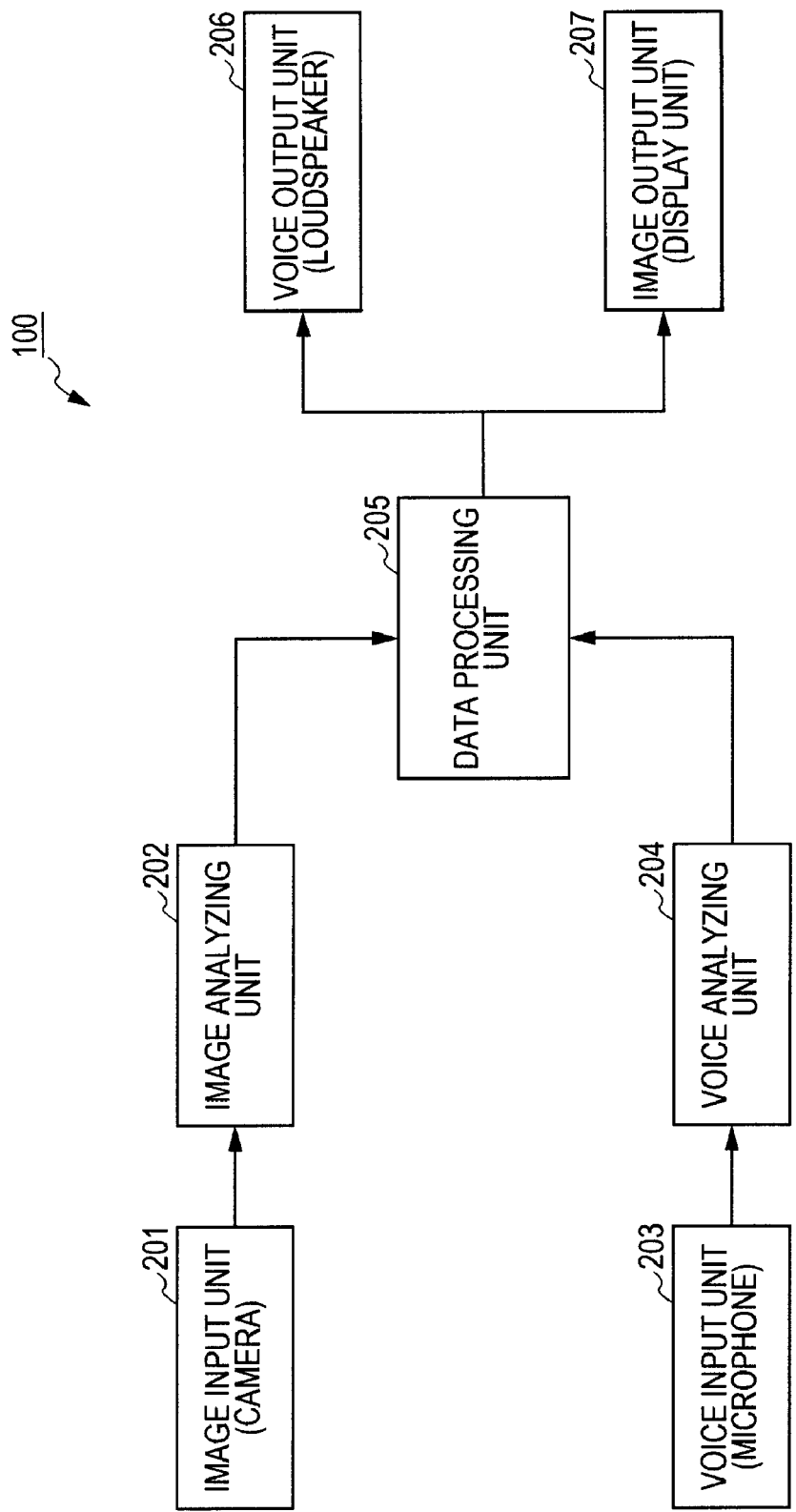
FIG. 2 is a block diagram of an example of structure of the information processing apparatus according to the embodiment of the present disclosure.

As depicted in FIG. 2, the information processing apparatus 100 has an image input unit (camera) 201, an image analyzing unit 202, a voice input unit (microphone) 203, a voice analyzing unit 204, a data processing unit 205, a voice output unit (loudspeaker) 206, and an image output unit (display unit) 207.

The image input unit (camera) 201 receives an input of an image surrounding the information processing apparatus 100, for example, an image of the user. An image shot by the image input unit (camera) 201 is input to the image analyzing unit 202. The image analyzing unit 202 uses, for example, registered information stored in advance in a storage unit, such as user's face information to identify a user included in the shot image. Specifically, information about the position of a user, who the user is, and others are analyzed. This analysis information is input to the data processing unit 205.

The voice input unit (microphone) 203 receives an input of voice information surrounding the information processing apparatus 100, for example, user's speech. The voice information input to the voice input unit (microphone) 203 is input to the voice analyzing unit 204. The voice analyzing unit 204 has a dictionary for voice analysis in a storage unit, analyzing words produced from the user by using the dictionary, and then inputs the analysis information to the data processing unit 205.

To the data processing unit 205, the voice analysis information is input from the voice analyzing unit 204 and the image analysis information is input from the image analyzing unit 202. According to the input information, the data processing unit 205 determines a process (action) to be performed by the information processing apparatus. That is, as described above, when the user's request is understood, a process according to the request is performed, for example, switching channels or selecting and playing a content.

Furthermore, the data processing unit 205 analyses, for example, the orientation of the face of the user, the direction of paying attention, the state of occurrence of errors, the current state of the system, and others and, based on this analysis result, provides information to the user with a level or mode of information provision to the user being changed.

An information output process is either one of a voice output via the voice output unit (loudspeaker) 206 and an image output via the image output unit (display unit) 207, or a combination thereof. Specific details of this will be described further below.

Figure 3:
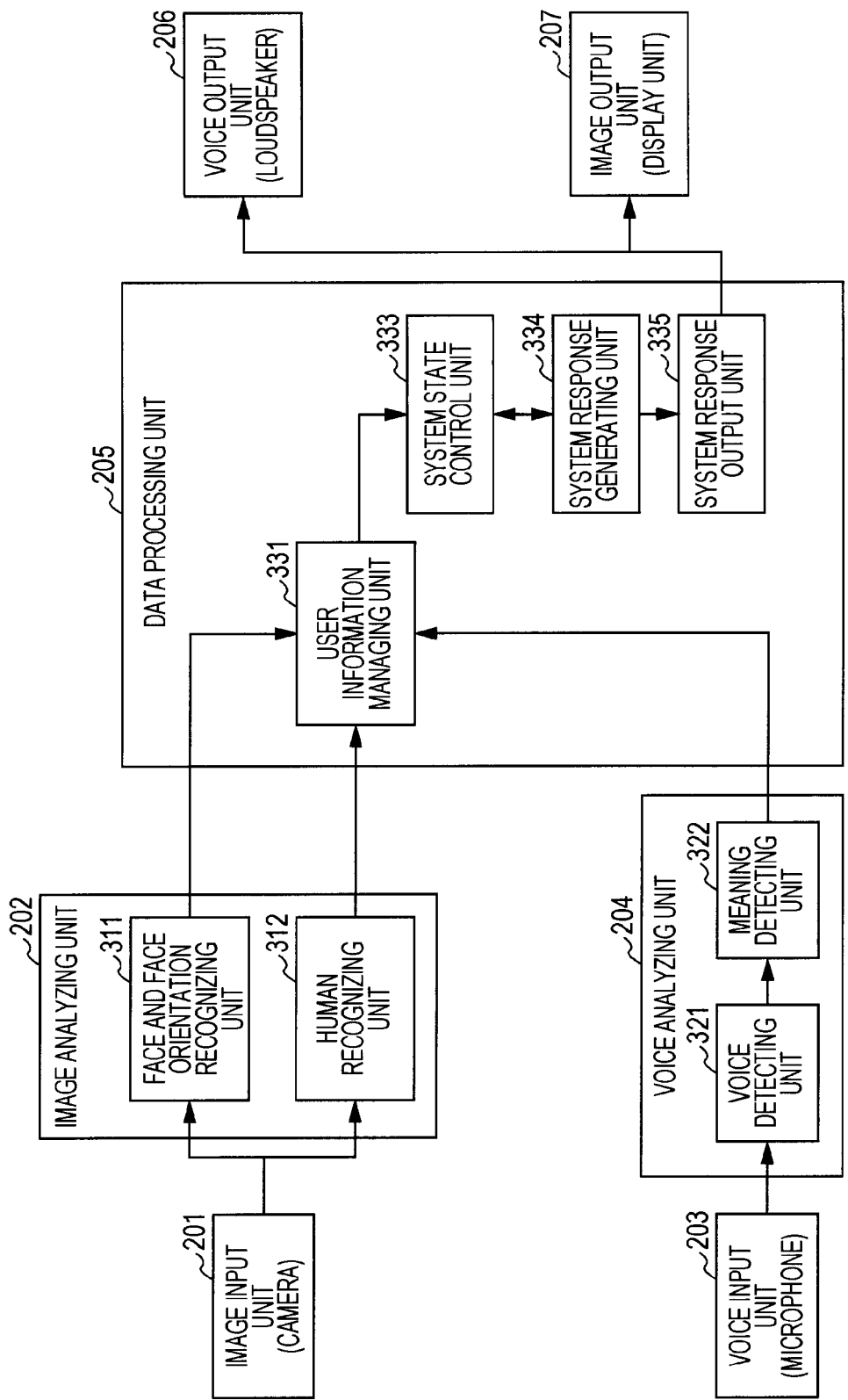
FIG. 3 is a block diagram of an example of detailed structure of the information processing apparatus according to the embodiment of the present disclosure.

FIG. 3 is a diagram of the detailed structure of the information processing apparatus 100 depicted in FIG. 2.

The image analyzing unit 202 has a face and face orientation recognizing unit 311 and a human recognizing unit 312.

The voice analyzing unit 204 has a voice detecting unit 321 and a meaning detecting unit 322.

The data processing unit 205 has a user information managing unit 331, a system state control unit 333, a system response generating unit 334, and a system response output unit 335.

In the face and face orientation recognizing unit 311 and the human recognizing unit 312 of the image analyzing unit 202, from a shot image input from the image input unit (camera) 201, it is determined whether a face or a human is present in a frame image for each sampling time at predetermined frame intervals. If present, a face attribute (such as the angle of the face, estimated age, and sex) is estimated, the orientation of the face is analyzed, the face is recognized, and so on. Note that dictionary data and face image information for these processes are registered in a memory in the image analyzing unit 202. For example, the process, such as face recognition, is performed based on the face of a person identified from the image input via the image input unit 201 through a matching process with the face image data registered in advance.

In the voice detecting unit 321 and the meaning detecting unit 322 of the voice analyzing unit 204, based on voice data input from the voice input unit (microphone) 203, the direction of a voice source is estimated, a voice section is detected, the meaning is comprehended, a degree of reliability is added, and so on. The voice analyzing unit 204 has a dictionary for voice analysis in a storage unit, analyzing words spoken by the user by using the dictionary and inputting analysis information to the data processing unit 205.

In this voice analyzing process, a process of rejecting sound other than voice and obtaining human voice only is performed. Furthermore, a process of extracting the meaning based on the obtained voice information is performed. This process is performed, for example, as a base of the matching process with the dictionary data retained in the voice analyzing unit 204. In this process, for example, if no registered word matches, data is rejected as meaningless speech. Furthermore, a degree of reliability in voice recognition is calculated. The degree of reliability is calculated based on, for example, a rate of matching with the dictionary data retained in the voice analyzing unit 204. Speech determined as having a low degree of reliability as a result of comparison with a preset threshold or the like is rejected.

As depicted in FIG. 3, the data processing unit 205 has the user information managing unit 331, the system state control unit 333, the system response generating unit 334, and the system response output unit 335.

The user information managing unit 331 receives an input of the output information from the face and face orientation recognizing unit 311 and the human recognizing unit 312, for example, information about whether a face is included in the image and, if included, the results of an estimation of the face attribute (such as the angle of the face, estimated age, and sex), an analysis of the orientation of the face, and a face recognition. Furthermore, from the meaning detecting unit 322 of the voice analyzing unit 204, an input of information about details of the speech is received. The user information managing unit 331 retains and manages these input information as user management information. Note that these pieces of information are sequentially updated with time and the user information managing unit 331 records these pieces of information in a memory as user information corresponding to each sampling time (t, t+1, t+2 . . . ) for management.

The user information retained in the user information managing unit 331 is provided to the system state control unit 333. The system state control unit 333 obtains and retains transitions of the state inside the system (the information processing apparatus), and uses both of the user information and the system state to determine a level (detailed/normal/brief) and mode of information provision from the system (the information processing apparatus 100) to the user.

Specifically, (1) it is determined which description level among the following (1a), (1b), and (1c) is used as an output information level in order to output information.

(1a) outputting brief description
(1b) outputting normal description
(1c) outputting detailed description Furthermore, (2) it is determined which mode or combination thereof among the following (2a), (2b), and (2c) is used as an output mode in order to provide a system response to the user.

(2a) voice output
(2b) text display output
(2c) output with sound effect and text display The system response generating unit 334 generates a system response according the response level and mode determined by the system state control unit 333.

The system response output unit 335 outputs the system response generated by the system response generating unit 334, for example, help information for the user. The output is produced via the voice output unit (loudspeaker) 206 and the image output unit (the display unit) 207.

3. Specific Example of the Information Output Process to a User

Next, as an example of process to be performed by the information processing apparatus of the embodiment of the present disclosure, a specific example of an information output process to the user is described.

As described above, in a multi-modal interface to which voice recognition or image recognition is applied, the performance of a voice recognition apparatus and an image recognition apparatus has a limitation, restricting understandable user's speech and action. Therefore, it is important to use a more effective level and mode to provide information from the system (the information processing apparatus 100) to the user.

For example, the process of the information processing apparatus of the embodiment of the present disclosure is as follows.

When the state is determined as any of the following, information, such as text, is displayed on the display unit and also sound effects and voice are output.

when a user's response is desired (for example, asking the user again like "Is that xxx?" when speech is determined as having a low degree of reliability)

when a warning is output from the system (for example, when speech is produced for asking a transition that is difficult to be made as a state transition)

when the user is not paying attention to the system (when the user does not face the system)

when no person produces speech in front of the system when no response from a user is returned to a once-issued system message within several seconds to several tens of seconds when a response from the system (a response from a user is desired) is issued as text with the user being in front of the system, but no response comes for a while In the cases above, for example, information, such as text, is displayed on the display unit and also sound effects and voice are output.

Also, when a feedback as to the same error as before is returned as voice, information with the use of brief words is provided.

Furthermore, when it is determined that the user is in front of the system while a content is being played, only text is displayed without voice.

In this manner, the information processing apparatus of the embodiment of the present disclosure determines an optimum information level (detailed/normal/brief) and information output mode according to the state of the user and the state of the system, and performs information output at the determined level and in the determined mode.

Each of the following processes for system response to be performed by the data processing unit 205 of the information processing apparatus of the embodiment of the present disclosure is described with reference to flowcharts depicted in FIG. 4 and FIG. 6, respectively.

(a) level determination process
(b) mode determination process

Figure 4:
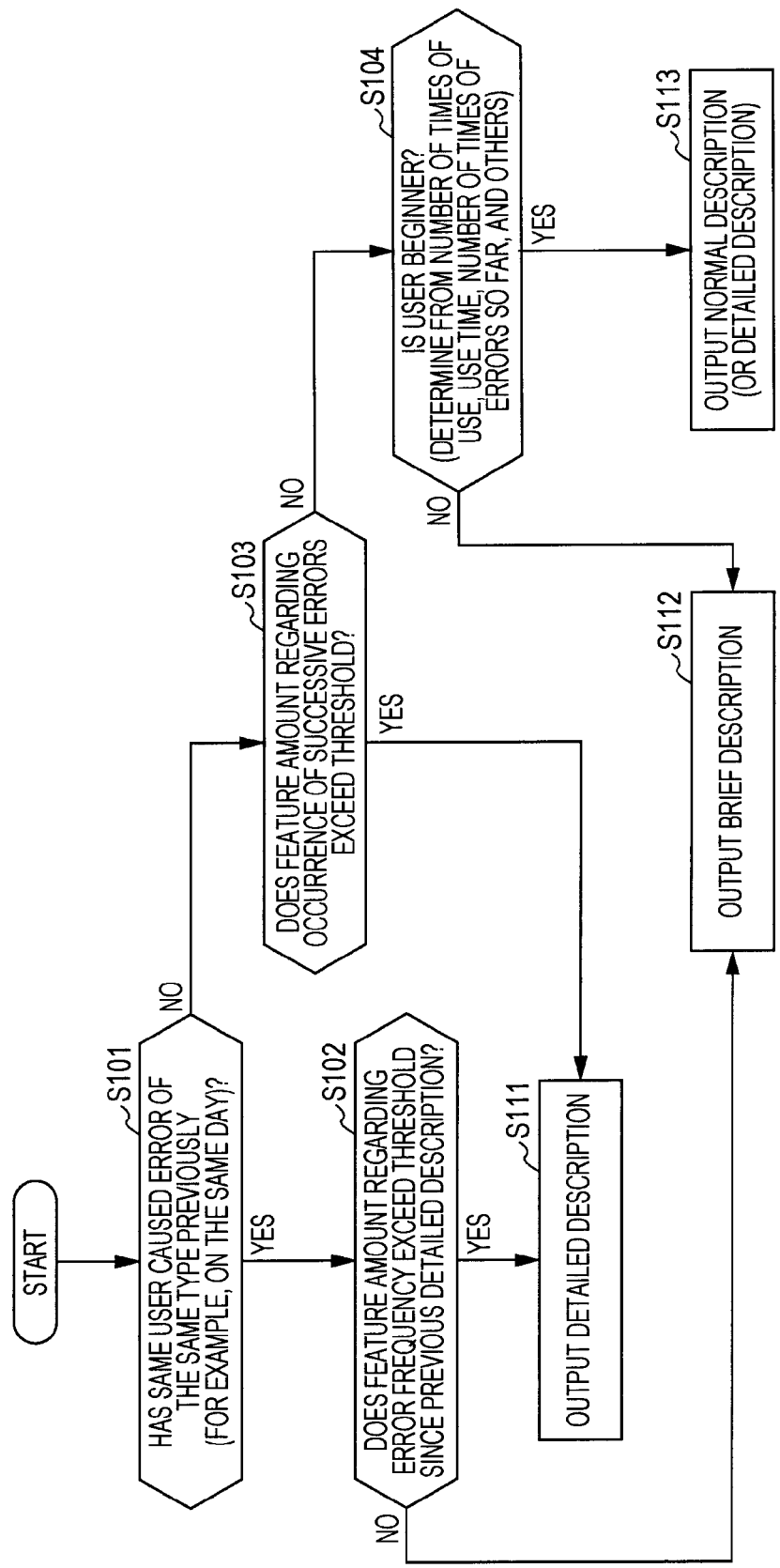
FIG. 4 is a flowchart for describing an example of processes to be performed by the information processing apparatus according to the embodiment of the present disclosure.

First, with reference to the flowchart depicted in FIG. 4, a process sequence of determining a level for system response to be performed by the data processing unit 205 is described.

First, it is determined at step S101 whether the same user has caused an error of the same type previously (for example, on the same day).

The system state control unit 333 of the data processing unit 205 records user information from the user information managing unit and information about processes performed by the system, errors that have occurred, and others as log information. Specifically, for each user identified, the system state control unit 333 records details about process errors caused by the system.

At step S101, when a new error occurs, it is determined, by referring to the log information, whether the same user has caused the same error previously.

The procedure goes to step S102 when the determination at step S101 is Yes, and the procedure goes to step S103 when the determination is No.

When the determination at step S101 is Yes, that is, when it is determined that the same user has caused the same error previously (for example, on the same day), the procedure goes to step S102, in which it is determined whether a feature amount regarding an error frequency exceeds a threshold since detailed description was made by the system to the user.

For example, when the threshold is set as three times, if a current new error is the fourth, the determination at step S102 is Yes. When a current new error is the second, the determination at step S102 is No.

The procedure goes to step S111 when the determination at step S102 is Yes, and an output is produced with detailed description as description to be output from the system.

On the other hand, when the determination at step S102 is No, the procedure goes to step S112, and an output is produced with brief description as description to be output from the system.

Also, when the determination at step S101 is No, that is, when it is determined that the same user has not occurred the same error previously (for example, on the same day), the procedure goes to step S103, in which it is determined whether the feature amount regarding occurrence of successive error exceeds a predetermined threshold.

This process is to determine whether the user has caused not the same error but different errors to successively occur. That is, it is determined whether the number of times of successive occurrence of errors of a plurality of different types exceeds a predetermined threshold. For example, this process is to determine whether a plurality of errors of different types, such as an error A, an error B, and an error C have been caused to occur successively. For example, when the threshold is set as three types, if it is determined that errors of four types or more have been caused to occur successively, the determination at step S103 is Yes. On the other hand, if it is determined that errors of three types or less have been caused to occur successively, the determination at step S103 is No.

When the determination at step S103 is Yes, that is, when the feature amount regarding occurrence of successive errors exceeds the predetermined threshold, the procedure goes to step S111, and an output is produced with detailed description as description to be output from the system.

On the other hand, when the determination at step S103 is No, the procedure goes to step S104.

At step S104, it is determined whether the user is a beginner unaccustomed to the operation of the system (the information processing apparatus 100). This determination process is performed based on the log information described above. That is, the determination is made from the number of times of the user using the apparatus, the number of times of occurrence of errors so far, details of occurrence of errors, and others.

When the determination at step S104 is Yes, that is, when it is determined that the user is a beginner unaccustomed to the operation of the system (the information processing apparatus 100), the procedure goes to step S113 to output normal description or detailed description. Note that normal description is description briefer than detailed description and more detailed than brief description.

On the other hand, when the determination at step S104 is No, that is, when it is determined that the user is not a beginner unaccustomed to the operation of the system (the information processing apparatus 100), the procedure goes to step S112 to output brief description.

FIG. 5 depicts an example of description levels. In FIG. 5, an example of description levels (a) to (c) is shown.
(a) normal description
(b) brief description
(c) detailed description
(a) Normal description is as follows, for example.
"Since (if a cause is known) . . . , xxx can be used."
Specifically,
"Since SOCCER has not been registered as a search keyword, please search for SPORTS."
"Since words cannot be recognized, please say that again."
"Since your voice cannot be recognized, please say that again a little more loudly."
(b) Brief description is as follows, for example.
"Please search for SPORTS."
"You can use SPORTS."
"Please say that again a little more loudly."
"Please say that again."
Brief description is such a short, brief description.
(c) Detailed description is as follows, for example.
"Usable commands are displayed in the guide window."
"On this screen, a genre such as movie or sports, a channel such as NHH or Tokyo Television . . . can be specified."
"You can select a genre from movie, sports, anime, music, variety show, and drama."
"Say as "Change it to xxx"."

In this manner, the information processing apparatus of the embodiment of the present disclosure outputs description to the user with its level being changed based on the user's error history and the user's level.

Figure 6:
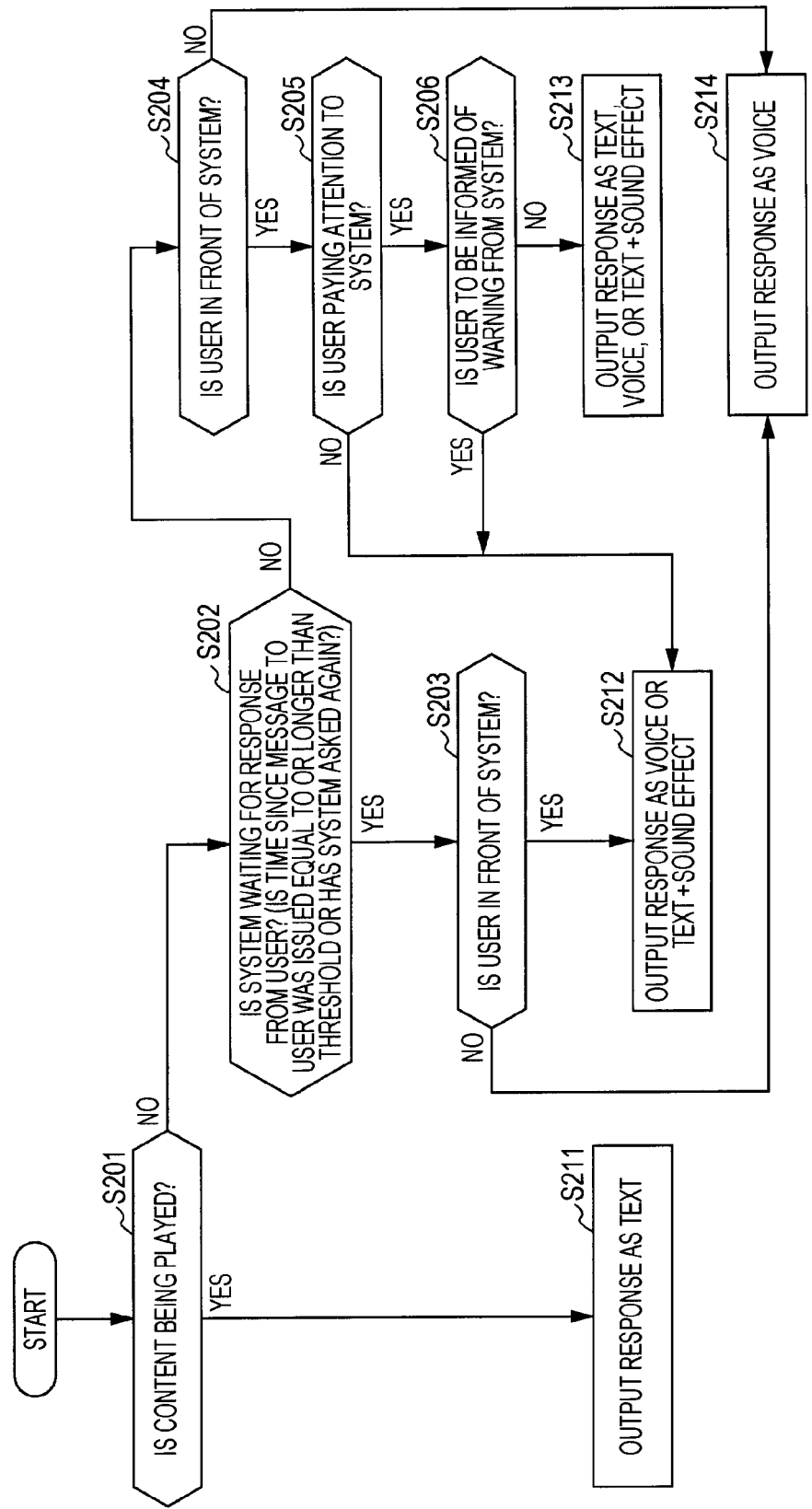
FIG. 6 is a flowchart for describing an example of processes to be performed by the information processing apparatus according to the embodiment of the present disclosure.

Next, with reference to the flowchart depicted in FIG. 6, a process sequence of determining a mode for system response to be performed by the data processing unit 205 is described.

First, it is determined at step S201 whether the system (the information processing apparatus 100) is playing a content.

This is performed by using system monitoring information of the system state control unit 333. If a content is being played, the determination at step S201 is Yes, and the procedure goes to step S211, in which description is displayed as text on the display unit.

This process is based on the determination that there is a high possibility that the user is watching the display unit where the content is being played.

On the other hand, when the determination at step S201 is No, that is, when it is determined that no content is being played, the procedure goes to step S202.

At step S202, it is determined whether the system (the information processing apparatus 100) is waiting for a response from the user. Specifically, it is determined whether the time since a message to the user was issued is equal to or longer than a threshold, or whether the system has asked again. The system state control unit 333 records processes performed by the system and furthermore the process time and elapsed time as log information, and a determination is made based on this log information.

When the determination at step S202 is Yes, that is, when it is determined that the system (the information processing apparatus 100) is in a state of waiting for a response from a user, the procedure goes to step S203.

At step S203, it is determined whether the user is in front of the system (the information processing apparatus 100). This determination process is performed based on the image information obtained by the user information managing unit 331 from the image analyzing unit 202.

When it is determined that the user is in front of the system, the determination at step S203 is Yes, and the procedure goes to step S212.

At step S212, description from the system is output with voice, or text and sound effect.

This process is to prompt the user with voice and sound effect because the user is in front of the system (the information processing apparatus 100) but it is difficult to determine that the user is watching the display unit.

On the other hand, when it is determined that the user is not in front of the system, the determination at step S203 is No, and the procedure goes to step S214. In this case, a response or description only with voice is output.

In this process, it is determined that the user is not in a state of watching the display unit, and a process of calling the user only with voice is performed.

Next, the process when the determination at step S202 is No is described. The case in which the determination at step S202 is No is such that it is determined that the system (the information processing apparatus 100) is not in a state of waiting for a response from the user. In this case, the procedure goes to step S204.

At step S204, it is determined whether the user is in front of the system (the information processing apparatus 100). This determination process is performed based on the image information obtained by the user information managing unit 331 from the image analyzing unit 202.

When it is determined that the user is in front of the system, the determination at step S204 is Yes, and the procedure goes to step S205.

On the other hand, when it is determined that the user is not in front of the system, the determination at step S204 is No, and the procedure goes to step S214. In this case, a response or description only with voice is output.

In this process it is determined that the user is not in a state of watching the display unit, and a process of calling the user only with voice is performed.

When the determination at step S204 is Yes, that is, when it is determined that the user is in front of the system, the procedure goes to step S205.

At step S205, it is determined whether the user is paying attention to the system (the information processing apparatus 100). Also this determination process is performed based on the image information obtained by the user information managing unit 331 from the image analyzing unit 202. That is, the determination process is performed by using information about the orientation of the face generated by the image analyzing unit 202.

When it is determined at step S205 that the user is paying attention to the system (the information processing apparatus 100), the procedure goes to step S206.

On the other hand, when it is determined at step S205 that the user is not paying attention to the system (the information processing apparatus 100), the procedure goes to step S212.

At step S212, description from the system is output with voice, or text and sound effect.

This process is to prompt the user with voice and sound effect because the user is in front of the system (the information processing apparatus 100) but it is difficult to determine that the user is watching the display unit.

When it is determined at step S205 that the user is paying attention to the system (the information processing apparatus 100), it is determined at step S206 whether the user is to be informed of a warning from the system. This is performed by using the system monitoring information of the system state control unit 333.

When a warning is to be output, the determination at step S206 is Yes. In this case, the procedure goes to step S212.

At step S212, description from the system is output with voice, or text and sound effect.

This process is to prompt the user with voice and sound effect because the user is in front of the system (the information processing apparatus 100) but it is difficult to determine that the user is watching the display unit.

On the other hand, when the determination at step S206 is No, that is, when no warning is to be output, the procedure goes to step S213.

At step S213, a system response or description information is output in any of the modes of text, voice, and text and sound effect.

This process is performed based on a determination that the user can be notified of a system response output in any of the modes because it has been confirmed that the user is paying attention to the system.

In this manner, the information processing apparatus of the embodiment of the present disclosure performs control over an eye response to the user with the output mode of description being changed according to the state of the user and the state of the system.

This processing enables the possibility that the user surely receives a message from the system to be increased.

4. Example of Hardware Structure of the Information Processing Apparatus

Finally, with reference to FIG. 7, an example of structure of hardware of the information processing apparatus performing the processes described above is described. A CPU (central processing unit) 701 performs various processes according to a program stored in a ROM (read only memory) 702 or a storage unit 708.

For example, the processes of the voice analyzing unit 204, the image analyzing unit 202, and the data processing unit 205 in the structure of the information processing apparatus of FIG. 2 are performed. In a RAM (random access memory) 703, programs and data to be executed by the CPU 701 are stored as appropriate. These CPU 701, ROM 702, and RAM 703 are connected to each other via a bus 704.

The CPU 701 is connected to an input/output interface 705 via the bus 704. To the input/output interface 705, an input unit 706, such as a camera, a microphone, a remote controller, a keyboard, a mouse, and others, and an output unit 707 formed of a display, a loudspeaker, and others are connected. The CPU 701 performs various processes corresponding to information input from the input unit 706, and outputs the process result to, for example, the output unit 707.

The storage unit 708 connected to the input/output interface 705 is formed of, for example, a hard disk, storing programs and various data to be executed by the CPU 701.

Furthermore, various voice information and dictionary data for voice recognition and, moreover, user image data and others for user recognition are recorded. A communicating unit 709 communicates with an external apparatus via a network, such as the Internet or a local area network.

A drive 710 connected to the input/output interface 705 drives a removable medium 711, such as a magnetic disk, an optical disk, a magneto-optical disk, or a semiconductor memory, and obtains programs and data recorded therein. The obtained programs and data are transferred to and store in the storage unit 708 as occasion demands.

In the foregoing, the present disclosure has been described in detail with reference to the specific embodiments. However, it is obvious that a person skilled in the art can modify or replace embodiments within the scope not deviating from the gist of the present disclosure. That is, the present disclosure is made merely as an example, and should not be restrictively interpreted. To determine the gist of the present disclosure, claims should be considered.

The series of processes described in the specification can be performed with hardware, software, or a composite of both. When the processes are performed with software, a program on which a process sequence is recorded can be installed in a memory in a computer incorporated in dedicated hardware for execution, or a program can be installed in a general computer capable of performing various processes for execution. For example, a program can be recorded in advance on a recording medium. The program can be installed from the recording medium to a computer, or can be received via a network, such as LAN (local area network) or the Internet, and installed in a recording medium, such as a built-in hard disk.

Note that various processes described in the specification may be performed not only in time series as described but also in parallel or separately according to the performance of an apparatus performing the processes or as occasion demands. Also, the system in the specification refers to a logical collective structure of a plurality of apparatuses, and is not restricted to a system in which the respective apparatuses are within one box.

The present disclosure contains subject matter related to that disclosed in Japanese Priority Patent Application JP 2010-127111 filed in the Japan Patent Office on Jun. 2, 2010, the entire contents of which are hereby incorporated by reference.

What is claimed is:

1. An information processing apparatus comprising:
an image analyzing unit performing a process of analyzing an image shot by a camera;
a voice analyzing unit performing a process of analyzing voice input from a microphone; and
a data processing unit receiving inputs of an analysis result of the image analyzing unit and an analysis result of the voice analyzing unit and controlling information to be output to a user; wherein:
the data processing unit determines an output mode of the information to be provided to the user based on user information obtained from the image analysis result and the voice analysis result, and system state information, and outputs the information to the user in the determined output mode;
the data processing unit determines based on the analysis result of the image analyzing unit whether the user is paying attention to the information processing apparatus and, when determining that the user is not paying attention to the information processing apparatus, performs information output with voice or sound effect;
the data processing unit controls output by changing a level of information to be output to the user based on information about errors previously caused by the user; and
the data processing unit determines a level of skill of the user for using the information processing apparatus based on operation history information indicating previous operations performed by the user on the information processing apparatus and, performs control of outputting a brief description when determining that the user is not a beginner and outputting a detailed description or a description at a normal level when determining that the user is a beginner.

2. The information processing apparatus according to claim 1, wherein the data processing unit determines based on the analysis result of the image analyzing unit whether the user is in front of the information processing apparatus and, when determining that the user is not in front of the information processing apparatus, performs information output with voice or sound effect.

3. The information processing apparatus according to claim 1, wherein the data processing unit performs information output to the display unit when determining based on the system state information that the information processing apparatus is playing content to the display unit.

4. The information processing apparatus according to claim 1, wherein the data processing unit determines based on the system state information whether the information processing apparatus is to output a warning to the user and, when determining that a warning is to be output, performs information output with voice or sound effect.

5. The information processing apparatus according to claim 1, wherein the data processing unit performs control of outputting a detailed description when the number of times of errors of a same type caused by a same user exceeds a predetermined threshold within a predetermined period.

6. The information processing apparatus according to claim 1, wherein the data processing unit performs control of outputting a detailed description when the number of times of errors of a plurality of different types successively caused by a same user exceeds a predetermined threshold within a predetermined period.

7. An information processing method to be performed in an information processing apparatus, the method comprising:
analyzing an image shot by a camera using an image analyzing unit;
analyzing voice input from a microphone using a voice analyzing unit; receiving inputs of an analysis result of the image analyzing unit and an analysis result of the voice analyzing unit;
controlling information to be output to a user using a data processing unit;
determining an output mode of the information to be provided to the user based on user information obtained from the image analysis result and the voice analysis result, and system state information;
outputting the information to the user in the determined output mode;
determining based on the analysis result of the image analyzing unit whether the user is paying attention to the information processing apparatus and, when determining that the user is not paying attention to the information processing apparatus, performs information output with voice or sound effect;
controlling output by changing a level of information to be output to the user based on information about errors previously caused by the user;
determining a level of skill of the user for using the information processing apparatus based on operation history information indicating previous operations performed by the user on the information processing apparatus; and
performing control of outputting a brief description when determining that the user is not a beginner and outputting a detailed description or a description at a normal level when determining that the user is a beginner.

8. A non-transitory computer-readable medium storing a program which, when executed by an information processing apparatus, causes the information processing apparatus to perform an information processing method comprising:

analyzing an image shot by a camera using an image analyzing unit;
analyzing voice input from a microphone using a voice analyzing unit;
receiving inputs of an analysis result of the image analyzing unit and an analysis result of the voice analyzing unit;
controlling information to be output to a user using a data processing unit;
determining an output mode of the information to be provided to the user based on user information obtained from the image analysis result and the voice analysis result, and system state information;
   outputting the information to the user in the determined output mode;
   determining based on the analysis result of the image analyzing unit whether the user is paying attention to the information processing apparatus and, when determining that the user is not paying attention to the information processing apparatus, performs information output with voice or sound effect;
controlling output by changing a level of information to be output to the user based on information about errors previously caused by the user;
determining a level of skill of the user for using the information processing apparatus based on operation history information indicating previous operations performed by the user on the information processing apparatus; and
performing control of outputting a brief description when determining that the user is not a beginner and outputting a detailed description or a description at a normal level when determining that the user is a beginner.

* * * * *